W. & B. F. BADER.
Hay-Loader.

No. 221,269. Patented Nov. 4, 1879.

Witnesses
Fred. G. Dietsch
J. B. Brock

Inventors
Wm Bader and
Benj. F. Bader
By W. B. Richards
Atty.

UNITED STATES PATENT OFFICE.

WILLIAM BADER AND BENJAMIN F. BADER, OF BADERS, ILLINOIS.

IMPROVEMENT IN HAY-LOADERS.

Specification forming part of Letters Patent No. 221,269, dated November 4, 1879; application filed August 16, 1879.

*To all whom it may concern:*

Be it known that we, WILLIAM BADER and BENJAMIN F. BADER, of Baders, in the county of Schuyler and State of Illinois, have invented certain new and useful Improvements in Hay Rakers and Loaders; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
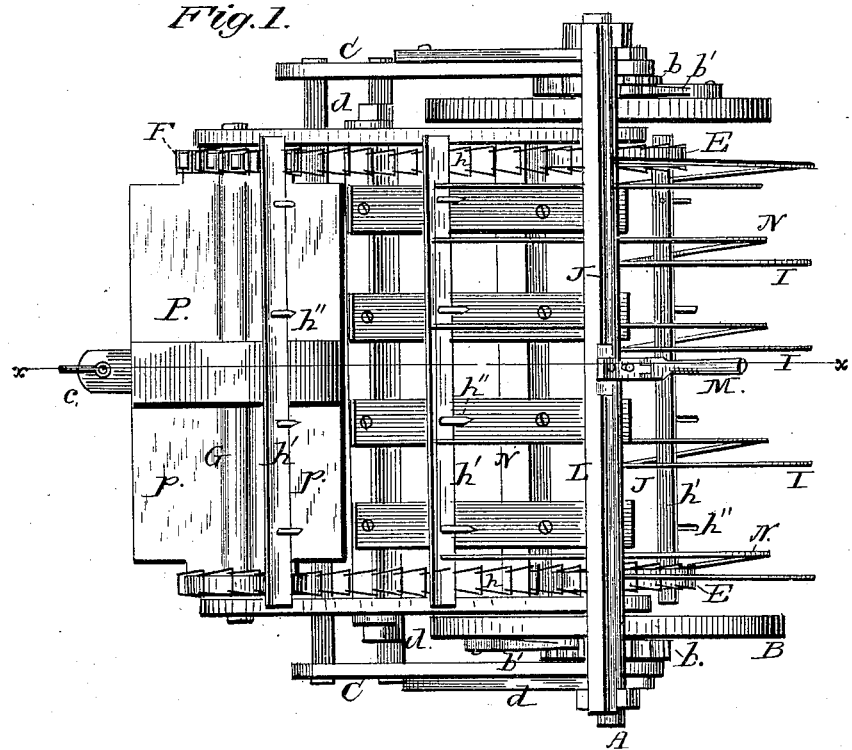
Figure 2:
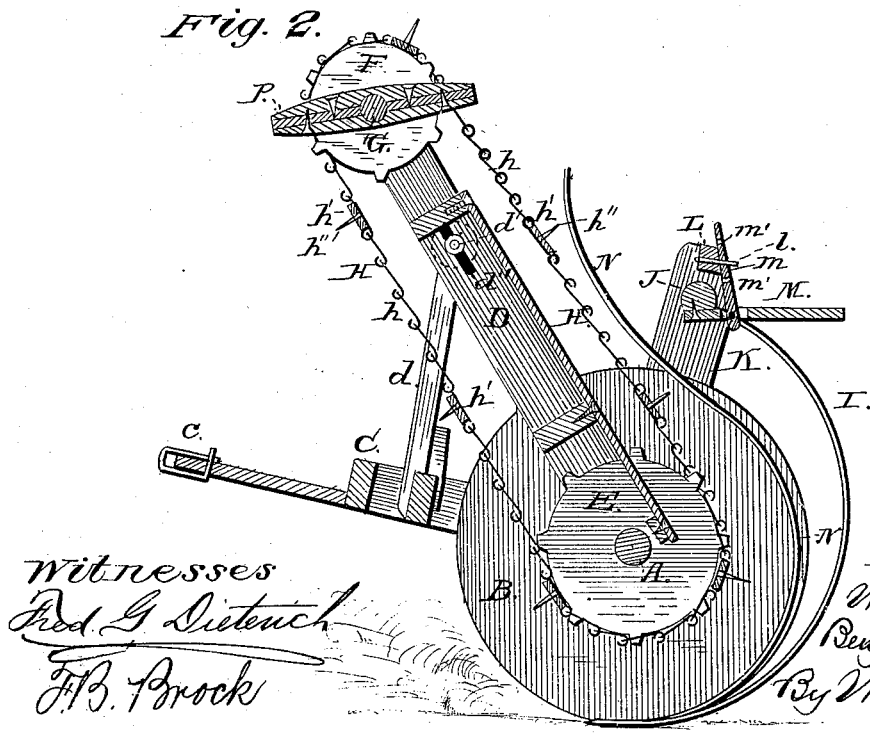

Figure 1 is a top-plan view of a construction embodying our invention. Fig. 2 is a vertical sectional view in the line $x\,x$ in Fig. 1.

This invention relates to implements for raking hay in the swath and delivering it onto a wagon; and it consists in constructions and combinations hereinafter described, and set forth in the claim hereto annexed.

Referring to the drawings by letters, A is an axle carried on wheels B B, which are free to rotate backward on the axle, but are made to rotate the axle as they rotate forward by means of ordinary ratchets $b$ and pawls $b'$.

C is a frame journaled at its rear end to the axle A, and its forward end, $c$, extended forward, so that it may be attached to the rear part of a wagon.

D is a frame journaled at its rear end to the axle A, and its forward end supported in an elevated position above the frame C by braces $d$, the upper ends of which may be secured at different positions on the frame D by bolts $d'$ and series of holes $d''$, to adjust the forward end of the frame D at different heights.

E E are chain-wheels, which are secured to and rotate with the axle A, and F F are chain-wheels fixed to a shaft, G, which has bearings at its ends in the upper forward ends of the side pieces of the frames D.

H is an endless belt, carrier, or elevator, formed of chain-belts $h\,h$, which run on the chain-wheels E and F, and are connected by transverse slats $h'$, from which pins $h''$ project, as shown in the drawings.

Letters I represent the curved spring rake-teeth depending from a rake-head, J, which is journaled at its ends in the upper ends of standards K, the lower ends of which are journaled on the axle A, and which project upward, so as to bring the rake-head about in a vertical position over the axle A.

L is a bar connecting the ends of the standards K above the rake-head J.

M is a hand-lever projecting from the rake-head J, and has an arm, $m$, fixed to its upper side, and pierced with holes $m'$, different holes of which may be engaged with the pin $l$ on the bar L, for the purpose of adjusting the rake-teeth in working position, and for raising them entirely free from the ground when desired.

To the lower end of each rake-tooth a spring-guard, N, is secured. The spring-guards N are curved backward, upward, and forward, so as to bring them in close proximity to the elevator H, as shown at Fig. 2 of the drawings, and in which positions it will be seen that they will aid in holding the hay upon the elevator.

The forward ends of the guards N are curved upward, as shown at Fig. 2 of the drawings, to prevent them catching in the elevator when the rake is raised, or when, by accident, the carrier is reversed.

P is a clearer formed of paddles $p$, projecting radially from the shaft G, as shown in the drawings. The diameters of the chain-wheels F bear such relation to the distances between the slats $h$ that the clearer P in rotating will have its paddles $p$ projected outward beyond the carrier-belt H, between the slats $h'$, as shown at Fig. 2 of the drawings, and thus aid in clearing and raising the hay free of the belt at its discharging end.

More paddles may be placed on the clearer, and more slats on the carrier-belt, if desired.

What we claim as new, and desire to secure by Letters Patent, is—

In combination with an elevator-belt and rake-teeth arranged in rear thereof, guards N, connected at their lower ends to the rake-teeth, and adapted to hold the hay upon the elevator-belt, and curved upward at their forward ends, substantially as described, and for the purpose specified.

In testimony that we claim the foregoing as our own we affix our signatures in presence of two witnesses.

WILLIAM BADER.
BENJAMIN F. BADER.

Witnesses:
H. A. ALLEN,
P. R. RICHARDS.